United States Patent [19]

Gattuso et al.

[11] Patent Number: 4,765,920

[45] Date of Patent: Aug. 23, 1988

[54] HIGH TEMPERATURE PROCESS FOR PRODUCING FINE MAGNETIC PARTICLES OF M-PHASE STRUCTURE

[75] Inventors: Todd R. Gattuso, Boston; Kenneth C. Koehlert, Medford; Matthew Neville, Boston; Steven R. Reznek; Joseph A. Senecal, both of Wellesley, all of Mass.

[73] Assignee: Cabot Corporation, Boston, Mass.

[21] Appl. No.: 885,346

[22] Filed: Jul. 14, 1986

[51] Int. Cl.$^4$ .................. C04B 35/26; C01G 49/02
[52] U.S. Cl. ........................... 252/62.58; 252/62.63; 423/594
[58] Field of Search .................. 423/632, 634, 594; 252/62.58, 62.63

[56] References Cited

U.S. PATENT DOCUMENTS

| | | | |
|---|---|---|---|
| 379,872 | 4/1943 | Ebner | 423/592 |
| 2,155,119 | 4/1939 | Ebner | 23/1 |
| 2,950,955 | 8/1960 | Wagner | 23/200 |
| 3,193,502 | 7/1965 | Schieber | 252/62.63 |
| 3,378,335 | 4/1968 | Ellis et al. | 23/51 |
| 4,336,242 | 6/1982 | Schmidberger et al. | 423/594 |
| 4,469,669 | 9/1984 | Hibst | 252/62.63 |
| 4,551,260 | 11/1985 | Hayakawa et al. | 252/62.63 |
| 4,664,831 | 5/1987 | Hibst et al. | 252/62.63 |

FOREIGN PATENT DOCUMENTS 56-149330 11/1981 Japan.
793700 3/1956 United Kingdom.
888688 5/1958 United Kingdom.

OTHER PUBLICATIONS

"Fine Grained Ferrites. I. Nickel Ferrite", Malinofsky et al., *Journal of Applied Physics*, Supplement to vol. 32, No. 3, Mar., 1961, pp. 237S-238S.
"Ultrafine Metal Oxides by Decomposition of Salts in a Flame", Nielsen et al., *Proceeding of the Electrochemical Society Symposium—Ultrafine Particles*, May 3, 1961, pp. 181-195.
"Preparation of Ferrites by the Atomizing Burner Technique", Wenckus et al., Conference on Magnetism and Magnetic Materials, (IEEE) Publication T-91 (1957), pp. 526-530.
"Sintering of Ferrite Powder Prepared by a New Spray-Roasting Technique", Akashi et al., Sintering and Related Phenomena–*Proceedings of International Conference*, Jun. 1965, pp. 747-758.
"Spray Roasted Iron Oxide for the Production of Ferrites", Ruthner et al., *Ferrite-Proc. of Int'l. Conference*, Kyoto, Japan, 1970.
"Fast Reaction Sintering Process for the Production of Ferrites", Ruthner *Journal de Physique*, Collogue C1, Supplement No. 4, Apr., 1977, pp. C1-311 to C1-315.

Primary Examiner—Patrick P. Garvin
Assistant Examiner—George R. Fourson
Attorney, Agent, or Firm—Gaston & Snow

[57] ABSTRACT

A method for producing fine magnetic particles having the barium or strotium ferrite M-phase crystal structure. An iron and alkaline earth metal halide feed solution is vaporized to form a precursor and oxidizing vapor phase. The precursor and hydrolyzing or oxidizing vapor phases are held in a reactor at a temperature sufficient to effect vaporization of the feed solution yet which is below the melting point of the desired M-phase crystal structure. Small iron oxide particles precipitate from the vapor phase and alkaline earth oxides thereafter. The alkaline earth oxide particles diffuse into the iron oxide particles to form the desired M-phase structure. When the desired width and thickness of the M-phase crystal platelets is achieved, the M-phase particles are cooled by quenching. Composition of the feed solution may be modified by substituting divalent metal halides for the alkaline earth metal halide or by substituting trivalent halides or a combination of a divalent metal halide and either a penta or quatravalent metal halide for the ferric halide.

25 Claims, 1 Drawing Sheet

HIGH TEMPERATURE PROCESS FOR PRODUCING FINE MAGNETIC PARTICLES OF M-PHASE STRUCTURE

FIELD OF INVENTION

The present invention relates to a method of producing fine magnetic particles and, more particularly, relates to a method of producing single, unaggregated magnetic oxide particles having the barium ferrite M-phase or magnetoplumbite crystal structure.

BACKGROUND STATEMENT OF THE ART

Powders for ceramic permanent magnetics have been fabricated by a variety of methods in the prior art. Traditionally, these iron oxide powders were formed by sintering an admixture of iron oxide with other oxides or compounds which yield the desired composition. Although the particles finally produced were magnetic, they were much too large as a result of the extensive heat treating for service in fine particle magnetic applications such as magnetic recording media.

In order to overcome these limitations, several methods of producing permanent magnetic materials, such as barium or strontium ferric oxides, in high temperature environments rather than by admixing and sintering have been developed by the prior art. British Patent No. 888,688 teaches a method of making fine barium ferrites by injecting atomized iron and barium salt solutions into an oxidizing flame at temperatures between 1000° C. and 1400° C. The powder produced by this process does not, however, possess the M-phase crystalline form but instead consists of mixed or indeterminant phase particles exhibiting only soft magnetic properties. A subsequent heat treating step at a temperature above 600° C. is therefore required to convert the mixed phase particles to the desired M-phase. Because this heat treatment must be applied to powders in bulk, extreme caution must be practiced to ensure that localized sintering of the single powder particles does not take place, otherwise the powder's size, shape and aggregation will be adversely affected.

A method of producing metal oxide compounds by passing feed solution droplets in countercurrent flow through hot gases was disclosed in U.S. Pat. No. 3,378,335. Decomposition of the metal salt droplets occurred at temperatures between 600° C. and 800° C. which are much too low to promote formation of particles having the M-phase structure. The powder produced by this method consisted of mixtures of fine particles of different crystal phases. Consequently, even after subsequent heat treatment, the particles exhibited minimal coercive field strength and saturation magnetization.

In a publication entitled "Ultrafine Metal Oxides by Decomposition of Salts in a Flame", *Proceeding of the Electrochemical Society Symposium—Ultrafine Particles,* May 3, 1961, pp. 181–195, the authors disclose that a large number of mixed metal oxides, including barium ferrite, may be formed by injecting metal salts into a flame environment. No processing steps or parameters for forming the barium ferrite are delineated, nor is the crystal structure of the ferrite particles recited. Hence, the reference fails to teach or suggest any method steps or conditions by which the M-phase crystal structure may be formed.

Barium or strontium ferrite particles possessing the M-phase crystal structure were produced by the high temperature decomposition of a metal salt solution in U.S. Pat. No. 4,336,242. In the practice of this method, barium or strontium ferrous salt solutions are fed into a flame and then substantially converted to an M-phase barium or strontium ferrite. It is essential, according to the teaching of this patent, that each salt particle be formed directly from a single solution droplet. No local demixing of the individual components can occur; hence, the homogeneous distribution of the substances dissolved in solution is retained during the entire reaction. In order to maintain the desired homogeny, it is imperative that the reaction be carried out at an extremely rapid rate. Consequently, the process requires the use of low vapor pressure ferrous chloride, mixed chloride nitrate salts and powder temperatures limited to 1,173° K. Moreover, since the size of the M-phase particle is dependent upon the original droplet size, the process is incapable of producing fine, unaggregated M-phase particles. Under these conditions, the particles produced are large, on the order of 1 to 10 microns, and are composed of various segments of different crystalline orientations which require a subsequent grinding process to separate the individual primary grains. Hence, the process disclosed in U.S. Pat. No. 4,336,242 fails to produce fine, single ferrite particles having the M-phase crystal structure.

SUMMARY OF THE INVENTION

The present invention is a method of producing fine, unaggregated barium or strontium ferrite particles having an M-phase crystal structure. The particles, having the chemical composition $SrFe_{12}O_{19}$ or $BaFe_{12}O_{19}$, are single crystals of the M-phase, that is, the structure of the mineral magnetoplumbite. In order to modify the magnetic properties of the M-phase particles, both the divalent alkaline earth metal ion and the trivalent ferric ion can be partially replaced with other metallic ions. The divalent ion can be partially substituted with divalent lead, lanthanum, calcium or mixtures thereof. Of course, if either lead of lanthanum is fully substituted for the barium or strontium, the M-phase structure is unstable at low temperatures but is the preferred phase at higher temperatures. The ferric ion may be partially replaced by other trivalent metal ions such as indium, aluminum, gallium or mixtures thereof as well as by mixtures of divalent and either quatra or pentavalent ions where the average valence is three. The divalent alkaline earth metal and trivalent iron can be substituted simultaneously with trivalent lanthanum or lanthanide rare earths and a divalent metal, such as cobalt, nickel or ferrous iron.

In one important embodiment of the present invention, an iron and either strontium or barium halide feed solution, having a ratio of alkaline earth metal to iron equal to or in excess of that found in the desired crystal structure, is introduced into a high velocity flame having a temperature sufficient to effect vaporization of the halide salt solution. The velocity of the flame carries the feed solution into a reactor where the iron and alkaline earth metal droplets completely vaporize into an iron and alkaline earth metal halide vapor phase and an oxidizing or hydrolyzing phase consisting of, depending upon the composition of the feed solution solvent, either air, oxygen, steam or mixtures thereof. The vaporized feed solution is held in the reactor at a temperature sufficient to effect and maintain vaporization of the halide salt solution yet which is below the melting temperature of the desired M-phase crystal structure. Under oxidizing conditions, the iron and alkaline earth metal halide vapor reacts with the oxidizing or hydrolyzing vapor and converts to an iron oxide or a combined iron oxide and alkaline earth metal oxide vapor phase. Because the metal oxide vapors are in excess of their equilibrium concentration, the metal oxide particles precipitate therefrom. Since the evaporation and oxidation rate of the iron halide and the alkaline earth metal halide are different, the iron oxide particles precipitate first and the alkaline earth metal oxides particles precipitate thereafter. The presence of hydrogen chloride may mitigate against the vapor phase formation of the alkaline earth metal oxide. The alkaline earth metal oxide may therefore be formed on the surface of the previously formed iron oxide particles. The vaporized iron and alkaline earth metal halide phase reacts with the oxidizing or hydrolyzing phase and converts to at least an iron oxide vapor and possibly to both an iron oxide and alkaline earth metal oxide vapor phase when thermodynamically permissible. The iron oxide vapor is beyond its equilibrium concentration and, as a result, iron oxide particles precipitate from the vapor phase. If necessary, the formation of the ferrite of the iron oxide provides the thermodynamic driving force for converting the alkaline earth metal halide to its oxide state. The alkaline earth metal oxide combines with the previously precipitated iron oxide particles to form the desired M-phase barium or strontium ferrite particles. Growth of the M-phase particles, produced under either hydrolyzing or oxidizing conditions, is restrained by quenching the particles when the desired size and shape has been reached.

In another important embodiment of the invention, the mixture of droplets and the oxidizing or hydrolyzing vapor are held in a high temperature pre-reactor prior to introduction into the main reactor. This pre-reactor treatment increases the rate of evaporation of the halide salts which otherwise occurs very slowly. The alkaline earth metal halide droplets are held in the pre-reactor at a temperature which is greater than the main reactor. The droplets and vapor mixture reside in the reactor for the minimum period of time necessary to evaporate the salts, on the order of 20 milliseconds. A fluid is then introduced into the pre-reactor to cool the vapor to a temperature compatible with the temperature existing in the main reactor. The vaporized feed solution then passes into the main reactor and is treated according to the same processing conditions described above.

Accordingly, it is a primary object of the present invention to provide an improved method of making single, unaggregated magnetic oxide particles having an M-phase crystal structure.

It is another object of the present invention to provide a method where the size of the M-phase particles is easily controlled.

It is another object of the present invention to provide a method of making single, unaggregated magnetic oxide particles which are easily doped by a varying range of compositions.

It is a still further object of the present invention to provide a simple, inexpensive method of making single, unaggregated magnetic oxide particles.

BRIEF DESCRIPTION OF THE DRAWING

These and other details and advantages of the invention will be described in connection with the accompanying drawing in which.

DESCRIPTION OF THE PREFERRED EMBODIMENT

Figure 1:
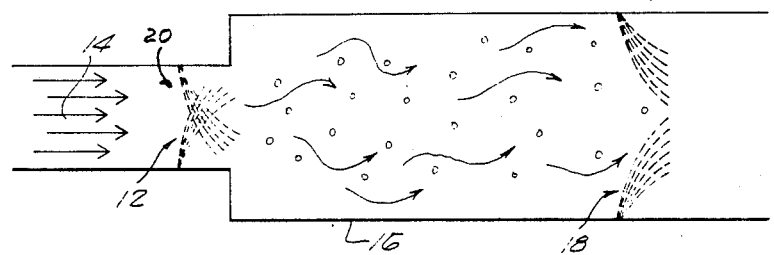
FIG. 1 is a schematic view illustrating the method of converting iron and alkaline earth metal halide feed solutions into fine, unaggregated magnetic oxide particles according to the preferred embodiment of the invention.

At the outset, the invention is described in its broadest overall aspects with a more detailed description following. The present invention is a method of making fine, unaggregated magnetic oxide particles having a barium ferrite M-phase crystal structure. In the preferred embodiment, an iron and alkaline earth metal halide feed solution 12 is introduced into a high velocity flame 14 having a temperature sufficient to evaporate the feed solution. The feed solution is preferably formed by blending aqueous solutions of a ferric halide and an alkaline earth metal halide, consisting of either a barium or strontium halide, such that the mole ratio of the alkaline earth metal to the iron is equal to or greater than the mole ratio desired in the final product. The excess alkaline earth metal guarantees that substantially all of the iron oxides will combine with the alkaline earth metal oxide and convert to particles having the M-phase crystal structure. The ratio of the alkaline earth metal to iron in the feed solution can be as large as 3:12 but is preferably around 1:12. The ratio of strontium to iron, for example, of the pure M-phase crystal material is around 1:12. Although the alkaline earth metal halide preferably includes either a barium halide, a strontium halide or mixtures thereof, in alternative embodiments the alkaline earth metal halide may be replaced in part by divalent metal halides of either lead, lanthanum, calcium or mixtures thereof. Furthermore, the ferric halide may be partially replaced with other trivalent metal halides including aluminum halide, indium halide, gallium halide or mixtures thereof or instead by metal halides consisting of a mixture of a divalent halide, such as cobalt chloride, and either quatra or pentavalent halides such as titanium tetrachloride, silicon tetrachloride, tantalum pentachloride, niobium pentachloride or vanadium pentachloride. Alternatively, the alkaline earth metal and ferric ions can be simultaneously substituted with combinations of trivalent lanthanum or lanthanide rare earths and a divalent metal such as cobalt, nickel or ferrous iron. Although the feed solution solvent is preferably water, in alternative embodiments mixtures of water and an organic solvent such as an alcohol or other hydrophilic compounds may also be utilized.

The iron and alkaline earth metal halide feed solution is preferably in the form of fine droplets prior to its evaporation. The fine droplets are obtained, in the preferred embodiment, by kinetically atomizing the feed solution with the high velocity flame. The flame, which may be created by combustion of a fuel such as methane or by generation of a plasma arc, has a velocity at the time of introduction of the feed solution of at least Mach 0.1. The ratio of kinetic energy per unit volume of the liquid feed stream to that of the high velocity flame is between 2 and 40:1. In the kinetic atomization method, the feed solution is injected into the high velocity flame as a coherent stream of liquid. The high shear and turbulence of the high velocity gas atomizes the iron and alkaline earth feed solution into fine droplets which become entrained in the high velocity gas stream. Although in the preferred embodiment the feed solution is broken into fine droplets by kinetic atomization, other methods of transforming the feed solution into droplets, such as by passing the feed solution through the orifices of an atomizing nozzle, may alternatively be utilized as is well known to those skilled in the art.

Subsequent to the introduction of the iron and alkaline earth metal feed solution into the high velocity flame, the combined mixture of the feed solution droplets and the gas stream is carried by the flow of the gas into a main reactor 16. Once in the reactor, the fine feed solution droplets vaporize completely into a precursor phase consisting of an iron halide vapor and an alkaline earth metal halide vapor and an oxidizing or hydrolyzing phase consisting of either air, oxygen, steam, or mixtures thereof.

Under oxidizing conditions, the vaporized iron and alkaline earth metal halide reacts with the oxidizing or hydrolyzing vapor and converts to an iron oxide or a combined iron and alkaline earth metal oxide vapor phase. Since the metal oxide vapors are in excess of their equilibrium concentration, solid particles of metal oxide precipitate therefrom. The iron oxide and alkaline earth metal oxide particles do not precipitate simultaneously from the vapor phase because the iron and alkaline earth metal halides have different rates of evaporation and oxidation. Hence, the small iron oxide particles precipitate from the vapor phase first and the alkaline earth metal oxides precipitate thereafter. The alkaline earth oxide may form on the surface of the previously formed iron oxide particles. The fine precipitated particles combine together and an alkaline earth ferrite having the desired M-phase structure is formed.

The vaporized iron and alkaline earth metal halide vapor phase converts to at least an iron oxide vapor and possibly to both an iron oxide and alkaline earth metal oxide vapor phase. In the first instance, the conversion of the alkaline earth metal halide to its oxide state may be thermodynamically impermissible until precipitation of the solid iron oxide particles commences. The alkaline earth metal halide vapor converts to an alkaline earth metal oxide in the presence of the iron oxide. The alkaline earth metal oxide particles diffuse into the earlier precipitated fine iron oxide particles and the desired M-phase crystal structure is formed.

Once the desired size and shape has been reached, the M-phase particles are quenched to restrain further growth. This can be accomplished by adding a cooling fluid 18 such as water or air to the reactor atmosphere or by passing the vapor phase and the precipitated particles entrained therein through a cooling medium. If the feed solution contains an excess of alkaline earth metal, substantially all the iron will now be in the M-phase. The alkaline earth metal rich by-products of the high temperature conversion process are easily removed by dissolving the product in an aqueous solution and then separating the M-phase particles from the solvent by conventional means known to those skilled in the art.

Since the conversion of the iron halide and alkaline earth metal halide phases to their oxide phases must take place when the components are in the form of a vapor rather than a solid, it is imperative that the reactor is maintained at a temperature which is high enough to ensure that the halide salts are vaporized. When the vaporized feed solution is held in the reactor under such conditions, the halide salts in the precursor phase react with the oxidizing or hydrolyzing phase to form iron oxide and possibly iron and alkaline earth metal oxide gases. The halide vapors are ensured of fully converting to their associated oxide state, if the gases phase is sufficiently oxidizing, e.g. having an oxygen mole percent between 0.5 and 30. The oxide phases which form under these parameters are in excess of their equilibrium concentration for the vapor phase and, consequently, iron oxide or iron and alkaline earth metal oxide particles precipitate therefrom.

Diffusion of the alkaline earth metal oxide particles into the ferric oxide particles is a critical step in the formation of the M-phase ferrite particle. To ensure that the crystallization of the M-phase particles proceeds unimpeded, two reactor parameters must be carefully controlled: temperature and residence time.

The diffusion rate of the alkaline earth metal oxide particles into the iron oxide particles significantly increases as the temperature in the reactor vessel accordingly increases. Nonetheless, the conversion of the iron and alkaline earth metal halides to oxides cannot be performed at excessively high temperature since the barium ferrite precipitates will decompose by peritectic melting at temperatures above 1730° K. and the strontium ferrite precipitates will decompose at temperatures above 1670° K. Moreover, lead ferrite is stable only up to temperatures around 1590° K. The addition of dopants such as cobalt and titanium would also urge the decomposition temperature of the M-phase crystallographic structure even lower. Hence, the reactor temperature cannot exceed the decomposition point of the desired M-phase structure and, therefore, the temperature of the reactor vessel must be less than 1730° K. when M-phase barium ferrite is desired to be produced and less than 1670° K. when M-phase strontium ferrite is the desired particle to be produced. Accordingly, when the process is designed to produce M-phase particles having a partial substitution of another metal ion or ions for either the alkaline earth metal divalent ion or the ferric trivalent ion, the reactor vessel should be maintained at a temperature below the melting temperature of the doped M-phase particle which is to be produced.

The residence time of the vapor in the main reactor is controlled in order to ensure that the alkaline earth metal oxide particles are fully diffused into all, or substantially all, of the iron oxide particles so that conversion of an optimal number of iron oxide particles to the desired M-phase crystal structure can be achieved. On the other hand, the longer the vapor phase remains in the reactor the larger will be the size of the M-phase platelet particles produced. Consequently, the vapor phase is held within the reactor for a range of residence times between 30 and 400 milliseconds to ensure that the platelets produced have an M-phase crystal structure and that the mean platelet width can be as small as 0.05 microns or as large as 0.5 microns and that the thickness of the platelets range between 1/10 and ½ of the platelet width. Platelet width and thickness is controllable by varying the temperature and residence time of the vapor in the reactor as well as the relative concentration of iron oxide particles per unit volume of the vapor phase. Thus, optimal diffusion of the alkaline earth metal oxide particles into the iron oxide particles is ensured by holding the vaporized feed solution in the reactor at a temperature which is below the melting point of the desired M-phase crystal structure. The reactor temperature must be sufficiently high to effect vaporization of the halide salt solution and to allow diffusion formation of the M-phase within a time period between 30 and 400 milliseconds. Under these processing conditions, substantially all of the iron oxide particles will convert to the desired M-phase crystal structure and the objectives of the present invention will be met.

The fraction of the iron in the feed solution which will convert to the M-phase structure increases as the residence time of the vaporized feed solution in the reactor increases, according to the expression $(1-\exp(-t/\tau))$, where $\tau$ is the characteristic time constant. $\tau$ will increase if the diffusion length or particle size is large or if the diffusion constant, D, is small. Since the diffusion constant depends exponentially on temperature and $\tau$ increases rapidly if the temperature is lowered, the fraction of iron oxide in the M-phase will fall unless the reactor temperature is high. High yield of the M-phase therefore depends on the following three conditions: the reactor vapor must be heated as close to the decomposition temperature as possible, the residence time must be long, and the reactor must lose as little heat as possible during processing. High yield of M-phase crystal platelets can therefore be obtained when the initial reactor temperature is greater than 1350° K., the residence time is greater than 30 milliseconds and the heat loss of the reactor during processing is small enough to limit the temperature drop to no more than 200° K. Hence, in the preferred embodiment, the vapor phase resides within the reactor for a period of time between 30 milliseconds and 400 milliseconds, at a temperature which is sufficient to effect vaporization of the halide salts yet which is below the decomposition temperature of the desired M-phase crystal structure, such that the heat loss from the reactor during the conversion of the feed solution into M-phase particles is minimal enough to limit the temperature drop to less than 200° K. Under these preferred conditions, M-phase structured platelets having a width as small as 0.05 microns or as large as 0.5 microns and a thickness between 1/10 and ½ that of the width can be easily produced.

Figure 2:
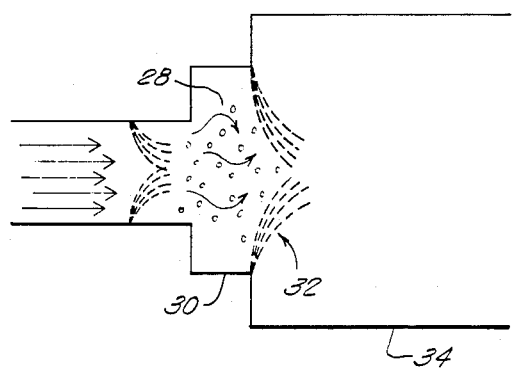
FIG. 2 is a schematic view of an alternative embodiment of the invention which includes a high temperature pre-reactor for enhancing the evaporation rate of the metal halides before their conversion into fine, unaggregated particles.

In an alternative embodiment, the mixture of droplets and hydrolyzing or oxidizing vapor 28 is held in a high temperature pre-reactor 30 prior to its introduction into the main reactor as shown in FIG. 2. The purpose of this pre-reactor is to hasten the complete evaporation of the salt droplet. Ordinarily, the alkaline earth metal halide droplet evaporates slowly. The evaporation rate can be increased if the alkaline earth metal halide is held in a pre-reactor for less than 20 milliseconds at a temperature higher than the temperature in the main reactor. When the salts have evaporated, a cooling medium 32 such as nitrogen, air or some other fluid is introduced to lower the temperature to the values described above for the main reactor 34.

Although in the preferred embodiment the M-phase crystal platelets have the general formula $MFe_{12}O_{19}$ where M is either barium, strontium or mixtures thereof, other divalent metal ions such as lead, lanthanum, calcium or mixtures thereof may alternatively be substituted in part for the alkaline earth metals. Moreover, the trivalent ferric ion of the M-phase can also be partially replaced by other trivalent metal ions or by a combination of divalent and either quatra or pentavalent metal ions having an average valence of three according to the formula $MFe_{12-x}N_xO_{19}$ where M is either barium, strontium, calcium, lanthanum, lead or mixtures thereof and N is either indium, aluminum, gallium or mixtures thereof or the combination of cobalt, nickel, titanium, silicon, tantalum, niobium, vanadium or mixtures thereof having an average valence of three, and wherein x is in the range between 0 and 4. Additionally, trivalent lanthanum or lanthanide rare earths and divalent ions can be substituted according to the formula $M_{1-x}P_xFe_{12-x}Q_xO_{19}$, where P is trivalent lanthanum or a lanthanide rare earth and Q is a divalent ion such as nickel, cobalt or ferrous iron.

When doped M-phase ferrrite particles are desired the additional constituents should be introduced as halide salts into the high velocity flame simultaneously, or almost simultaneously, with the droplets of the original iron and alkaline earth halide feed solution. The simplest method is to dissolve all of the halide salts in a single feed solution. Unfortunately, certain metal halides are not stable in water solutions since they form either soluble hydroxide complexes or insoluble oxides. Therefore, in an alternative embodiment, they are introduced separately from the original feed solution 20. Aluminum trichloride, titanium tetrachloride, silicon tetrachloride and niobium pentachloride are typical of those metal halides which are not stable in halide water solutions and therefore must be introduced in a different manner than that which is appropriate in the preferred embodiment. Hence, such metal halide salts are either melted or vaporized and then injected separately into the hot gas. The unstable halide salts are introduced essentially simultaneously with or slightly after the iron and alkaline earth metal feed solution. The metal halides which are unstable in solution may be efficiently introduced into the high velocity flame by injecting the iron and alkaline earth metal halide feed solution through an orifice and the liquid or vapors of the unstable metal halides through an associated orifice separate and distinct from, but in close proximity to the first orifice. Although this is the preferred manner of introducing both unstable and stable halide salts into the high velocity flame, other conventional means known to those skilled in the art for simultaneously introducing solutions, liquids and vapors into an identical medium may also be utilized.

Subsequent to the introduction of the doped feed solution into the high velocity flame, the combined mixture, either as a single feed solution or as a plurality of feed streams, is carried by the high velocity flame into the pre-reactor or the main reactor where the entire feed solution vaporizes. Although a doped feed solution is utilized, the mole ratio of the alkaline earth metal to iron in the feed solution, including the dopant ions, may still be around 1:12 but can be as large as 3:12. Once in the main reactor, the doped feed solution remains entirely vaporized since the reactor temperature selected is sufficient to effect or maintain vaporization of the entire halide salt solution. Each of the vaporized halide salt phases reacts with the steam or oxygen of the oxidizing phase to form metal oxides. The iron and alkaline earth metal oxide vapors and dopant oxide vapors are in excess of equilibrium for the gaseous phase and, consequently, at least iron oxide, and possibly iron oxide, alkaline earth metal oxide and dopant oxide particles precipitate therefrom to form fine oxide particles. The iron oxide particles and their dopant substitutions again precipitate from the vapor phase first and the alkaline earth metal oxides thereafter diffuse into the iron oxide particles and their dopants to form the desired doped M-phase crystal structure.

The temperature in the main reactor and the residence time is again controlled to ensure that the decomposition temperature of the desired doped M-phase structure is not achieved and that the residence time is extensive enough for all of the iron oxide particles and their dopants to convert to the desired M-phase crystal structure. In order to ensure that a maximum yield of the doped M-phase crystal platelets is produced, the reactor temperature is preferably just below the melting temperature of the doped M-phase structure, the residence time is greater than 30 milliseconds and the heat loss is small enough to limit the temperature drop during processing in the reactor to less than 200° K. Once the doped M-phase particles of the desired width and thickness have been formed, they are cooled to restrain further grain growth. If the aforementioned processing parameters are followed, substantially all of the iron and iron dopants in the feed solution will now be in the M-phase crystal structure. Excess alkaline earth metal and substitutions thereof will be obtained along with the product and must be removed by conventional means.

In order to further illustrate the invention, the following examples are provided. It is to be understood, however, that the examples are included for illustrative purposes only and are not intended to limit the scope of the invention as set forth in the accompanying claims.

EXAMPLE 1

An aqueous feed solution was prepared consisting of ferric chloride and strontium chloride in the proportion of 12 moles to 1 mole. The solution salt content was 36.2 weight percent. The feed solution was injected at 40.9 kg/hr by means of an orifice nozzle at a velocity of 24.2 meters per second to a high velocity gas having a kinetic energy of 6065 J/m$^3$ such that the kinetic energy ratio of the liquid to gas was 4.5:1. The atomized liquid stream and high velocity flame were held within the main reactor at a temperature of 1448° K. for a residence time of 249 milliseconds. The processed stream was cooled by the addition of nitrogen gas. The particles formed in the process were recovered using a dust collector. The analysis of the product rendered indicated there were 0.92 moles of strontium per 12 moles of iron after washing, a specific surface area of 6.8 m$^2$/g and a coercivity of 2757 measured in a 10,000 Oe field.

EXAMPLE 2

An aqueous feed solution was prepared consisting of ferric chloride and strontium chloride in the proportion of 12 moles to 2 moles. The salt concentration was 38.0 weight percent and the feed rate was 40.4 kg/hr. The M-phase particles were then produced in the manner described in Example 1. The kinetic energy ratio of the liquid to gas was 4.3:1, the average reactor temperature was 1659° K. and the residence time of the vapor phase in the reactor was 216 milliseconds. Analysis of the product rendered indicated 1.01 moles of strontium per 12 moles of iron, a specific surface area of 9.0 m$^2$/g and a coercivity of 3878 measured in a 10,000 Oe field. The saturation magnetization before washing was 44 emu/gram. After washing the coercivity increased to 4671 and the saturation magnetization to 57.3 emu/gram.

EXAMPLE 3

A doped stontium ferrite of the formula Sr(CoTi)-Fe$_{10}$O$_{19}$ was made with excess titania present. The feed rate of the TiCl$_4$ vapor was, unfortunately, twice that intended. An aqueous feed solution was prepared containing iron, strontium and cobalt in the mole proportions 10:1.55:1.03. The salt content was 41.5 weight percent. The liquid feed was injected at a rate of 40.4 kg/hr in the manner described in Example 1 where the kinetic energy ratio of the liquid to the gas was 3.2:1. Titanium tetrachloride vapor mixed with dry nitrogen was injected into the high kinetic energy gas stream through a second orifice nozzle at a feed rate of 3.20 kg/hr of TiCl$_4$. The second nozzle was placed in close proximity to the first liquid feed nozzle. The process then proceeded in a manner similar to that described in Example 1. The vaporized feed solution was held in the reactor at an average temperature of 1631° K. for a residence time of 210 milliseconds. Analysis of the doped strontium ferrite M-phase particles produced indicated 1.55 moles of strontium per 10 moles of iron, 1.03 moles of cobalt per 10 moles of iron and 2.05 moles of titanium per 10 moles of iron. After washing, the composition was 1.28 moles of strontium per 10 moles of iron, 0.94 moles of cobalt per 10 moles of iron and 2.05 moles of titanium per 10 moles of iron. The product yield was determined to be over 90% M-phase by X-ray analysis. The specific surface area of the platelet was 8.1 m$^2$/g. The saturation magnetization was 42.0 emu/gram and the coercivity 1013 Oe, before washing. After washing the coercivity increased to 1096 Oe and the saturation magnetization increased to 54.0 emu/gram.

It is understood that the preceeding description is given merely by way of illustration and not in limitation of the invention and that various modifications may be made thereto without departing from the spirit of the invention as claimed.

We claim:

1. A method for producing unaggregated, primary grain magnetic particles having the barium or strontium ferrite M-phase crystal structure, comprising:
    evaporating droplets of an iron and alkaline earth metal halide containing feed solution in a main reactor to form an iron and alkaline earth metal halide vapor phase and an oxidizing or hydrolyzing vapor phase; and
    maintaining the iron and alkaline earth metal halide vapor phase and the oxidizing or hydrolyzing vapor phase in the main reactor at a temperature greater than 1350° K. yet which is below the decomposition point of unaggregated, primary grain magnetic particles having the barium or strontium ferrite M-phase crystal structure so that iron oxide and alkaline earth metal oxide particles form from the vapor phase and combine to form the unaggregated, primary grain magnetic particles having the barium or strontium ferrite M-phase crystal structure.

2. The method as recited in claim 1 wherein the feed solution droplets of the evaporating step are formed by passing the feed solution through an atomizing nozzle.

3. The method as recited in claim 1 wherein the feed solution droplets of the evaporating step are formed by kinetically atomizing the feed solution with a flame.

4. The method as recited in claim 3 wherein the flame has a velocity greater than Mach 0.1 and the iron and alkaline earth metal halide feed solution has a kinetic energy per unit volume ratio ranging between 2 and 40:1 as compared to that of the flame.

5. The method as recited in claim 1 wherein the evaporating step further comprises the step of holding the feed solution droplets in a pre-reactor at a temperature which is higher than the main reactor, whereby an iron and alkaline earth metal halide vapor phase and an oxidizing or hydrolyzing vapor phase is formed.

6. The method as recited in claim 5 wherein the residence time of the feed solution droplets in the pre-reactor is less than 20 milliseconds.

7. The method as recited in claim 5 further comprising the step of cooling the iron and alkaline earth metal vapor phase and the oxidizing or hydrolyzing vapor phase prior to the step of maintaining the iron and alkaline earth metal halide vapor phase and oxidizing or hydrolyzing vapor phase in the main reactor.

8. The method as recited in claim 1 wherein the ratio of iron to alkaline earth metal in the feed solution ranges between 1 and 3 times the iron to alkaline earth metal ratio in an unaggregated, primary grain magnetic particle having the barium or strontium ferrite M-phase crystal structure.

9. The method as recited in claim 1 wherein the iron and alkaline earth metal halide feed solution includes a sufficient amount of an M halide solution to produce unaggregated, primary grain magnetic particles having the barium or strontium ferrite M-phase crystal structure according to the formula $MFe_{12}O_{19}$ wherein M is selected from the group consisting of barium, strontium, lead, lanthanum, calcium and mixtures thereof.

10. The method as recited in claim 1 wherein the iron and alkaline earth metal halide feed solution includes a sufficient amount of an N halide solution to produce unaggregated, primary grain magnetic particles having the barium or strontium ferrite M-phase crystal structure according to the formula $MFe_{12-x}N_xO_{19}$ wherein M is selected from the group consisting of barium, strontium, lead, lanthanum, calcium and mixtures thereof, N is a trivalent metal selected from the group consisting of indium, aluminum, gallium and mixtures thereof, and x ranges from zero to one.

11. The method as recited in claim 1 wherein the iron and alkaline earth metal halide feed solution includes a sufficient amount of an N halide solution to produce unaggregated, primary grain magnetic particles having the barium or strontium ferrite M-phase crystal structure according to the formula $MFe_{12-x}N_xO_{19}$ wherein M is selected from the group consisting of barium, strontium, lead, lanthanum, calcium and mixtures thereof, N is selected from the group consisting of an equi-molar mixture of a divalent metal and a quatravalent metal and a two to one molar mixture of a divalent metal and a pentavalent metal, and x ranges from zero to one.

12. The method as recited in claim 1 wherein the iron and alkaline earth metal halide feed solution includes a sufficient amount of a P halide solution and a Q halide solution to produce unaggregated, primary grain magnetic particles having the barium or strontium ferrite M-phase crystal structure according to the formula $M_{1-x}P_xFe_{12-x}Q_xO_{19}$ wherein M is selected from the group consisting of barium, strontium, lead, lanthanum, calcium and mixtures thereof, P is selected from the group consisting of trivalent lanthanum, lanthanide rare earths and mixtures thereof, Q is selected from the group consisting of nickel, cobalt, ferrous iron and mixtures thereof, and x ranges from zero to one.

13. The method as recited in claim 1 wherein the iron and alkaline earth metal halide feed solution further includes at least one metal halide which is unstable in water solutions, the at least one water unstable metal halide being evaporated spatially separated from the remaining, water stable, portion of the iron and alkaline earth metal halide feed solution.

14. The method as recited in claim 1 further comprising the steps of:
placing the unaggregated, primary grain magnetic particles having the barium or strontium ferrite M-phase crystal structure in water; and
separating the M-phase particles having the barium or strontium ferrite M-phase crystal structure from any dissolved excess alkaline earth metal.

15. The method as recited in claim 13 wherein the unstable metal halide is anhydrous.

16. The method as recited in claim 13 wherein the anhydrous unstable metal halide is passed through an atomizing nozzle to form droplets of anhydrous unstable metal halide.

17. The method as recited in claim 15 wherein the anhydrous unstable metal halide is kinetically atomized with a flame to form droplets of anhydrous unstable metal halide.

18. The method as recited in claim 13 wherein the unstable metal halide is selected from the group consisting of aluminum trichloride, silicon tetrachloride, titanium tetrachloride, tantalum pentachloride, niobium pentachloride and vanadium pentachloride.

19. The method as recited in claim 1 wherein the oxidizing or hydrolyzing phase has an oxygen mole percent between 0.5 and 30 percent.

20. The method as recited in claim 1 wherein the main reactor temperature is less than 1730° K.

21. The method as recited in claim 1 wherein the main reactor temperature is less than 1670° K.

22. The method as recited in claim 1 wherein said maintaining step further includes maintaining the iron and alkaline earth metal halide vapor phase and the oxidizing or hydrolyzing vapor phase in the main reactor for a residence time ranging between 30 and 400 milliseconds.

23. The method as recited in claim 1 wherein the temperature drop of the main reactor resulting from heat loss during said maintaining step is less than 200° K.

24. The method as recited in claim 1 wherein said maintaining step includes maintaining the iron and alkaline earth metal halide vapor phase and the oxidizing or hydrolyzing vapor phase in the main reactor at a temperature just below the melting temperature of the M-phase crystal structure.

25. The method as recited in claim 1 further comprising the step of quenching particles having the M-phase structure to restrain further growth.

* * * * *